(12) United States Patent
Chen et al.

(10) Patent No.: US 10,684,533 B2
(45) Date of Patent: Jun. 16, 2020

(54) CAMERA MODULE WITH VARIABLE APERTURE

(71) Applicant: Spring Rainbow Optics Co., LTD, Taoyuan (TW)

(72) Inventors: Shih-Han Chen, New Taipei (TW); Yu-Teng Jheng, Changhua County (TW); Hung-Chang Cho, Taichung (TW)

(73) Assignee: SPRING RAINBOW OPTICS CO., LTD, Taoyuan (TW)

( * ) Notice: Subject to any disclaimer, the term of this patent is extended or adjusted under 35 U.S.C. 154(b) by 0 days.

(21) Appl. No.: 16/368,951

(22) Filed: Mar. 29, 2019

(65) Prior Publication Data

US 2019/0302572 A1 Oct. 3, 2019

Related U.S. Application Data

(60) Provisional application No. 62/651,881, filed on Apr. 3, 2018.

(51) Int. Cl.
*G03B 9/02* (2006.01)
*G02B 13/00* (2006.01)

(52) U.S. Cl.
CPC ........... *G03B 9/02* (2013.01); *G02B 13/0055* (2013.01); *G02B 13/0045* (2013.01)

(58) Field of Classification Search
CPC ...................................................... G03B 9/04
See application file for complete search history.

(56) References Cited

U.S. PATENT DOCUMENTS

| | | | | |
|---|---|---|---|---|
| 10,237,458 | B2* | 3/2019 | Lim | G02B 7/09 |
| 10,241,381 | B2* | 3/2019 | Chiu | G03B 9/02 |
| 2019/0204713 | A1* | 7/2019 | Imai | G03B 9/02 |
| 2019/0219892 | A1* | 7/2019 | Park | G02B 5/208 |

FOREIGN PATENT DOCUMENTS

JP  2002311319 A  * 10/2002

* cited by examiner

*Primary Examiner* — Clayton E. LaBalle
*Assistant Examiner* — Leon W Rhodes, Jr.
(74) *Attorney, Agent, or Firm* — WPAT, PC

(57) ABSTRACT

A camera module includes a variable aperture module and a lens module. The variable aperture module includes at least one aperture piece and a radial propulsion device. The lens module includes a lens assembly and an axial propulsion device. The axial propulsion device is configured to drive the lens assembly along an axial direction. The radial propulsion device is configured to propel the aperture piece in a radial direction approaching a central axis of the lens assembly, such that a portion of the aperture piece enters the lens assembly through an opening defined by the wall of the lens barrel. The radial propulsion device is configured to retract the aperture piece in a radial direction away from the central axis of the lens assembly, such that the portion of the aperture piece leaving the lens assembly through the opening defined by the wall of the lens barrel.

18 Claims, 4 Drawing Sheets

CAMERA MODULE WITH VARIABLE APERTURE

CROSS REFERENCE TO RELATED APPLICATIONS

The present application claims the benefit of priority under 35 USC 119(e) of U.S. Provisional Patent Application No. 62/651,881 entitled "IMAGING MODULE WITH ADJUSTABLE APERTURE" and filed on Apr. 3, 2018, the contents of which are incorporated herein by reference in their entirety.

FIELD OF THE INVENTION

The present disclosure relates to the technical field of cameras, and particularly to a camera module with variable apertures.

BACKGROUND OF DISCLOSURE

The basic principle of an aperture can be understood as a use of an annular light shielding film to change an amount of light entering the lens assembly. The aperture size is represented by a f value. The smaller the f value is, the larger the aperture is, the more the amount of light enters the lens assembly.

Since camera modules in current mobile phones are too small, the apertures are invariable, and it is difficult to achieve decent image quality both in the daytime and at night. If there is a variable aperture in a mobile phone, the mobile phone can be used to take photographs in different conditions. A large aperture can be used to take clear photos in low light conditions, and the depth of field is made shallow for bokeh. Moreover, a small aperture is used to ensure sharp image under bright light in the daytime.

Therefore, it is necessary to provide a camera module with variable apertures in a portable device, such as a mobile phone, for solving the problem of the prior art.

SUMMARY OF INVENTION

A primary object of the present disclosure is to provide a camera module with variable apertures for uses in different conditions.

A camera module with variable apertures is provided in an embodiment of the present disclosure, and includes:
at least one variable aperture module including:
at least one aperture piece, wherein an aperture is defined by the aperture piece;
a radial propulsion device configured to drive the aperture piece in a radial direction;
a lens module including:
a lens assembly being adjacent to the variable aperture module and including at least one lens and a lens barrel disposed around the lens, wherein an opening is defined by a wall of the lens barrel at a position corresponding to the aperture piece;
an axial propulsion device configured to drive the lens assembly along an axial direction toward an object end or an image end of the camera module;
wherein the radial direction is perpendicular to a central axis of the lens assembly, and the axial direction is parallel to the central axis of the lens assembly;
wherein the radial propulsion device is configured to propel the aperture piece in the radial direction approaching the central axis of the lens assembly, such that a portion of the aperture piece enters the lens assembly through the opening defined by the wall of the lens barrel, and the radial propulsion device is configured to retract the aperture piece in the radial direction away from the central axis of the lens assembly, such that the portion of the aperture piece leaving the lens assembly through the opening defined by the wall of the lens barrel.

In accordance with an embodiment of the present disclosure, the variable aperture module is not fixed onto the lens assembly.

In accordance with an embodiment of the present disclosure, in response to the axial propulsion device driving the lens assembly, the lens assembly displaces along the axial direction with respect to the aperture piece; in response to the axial propulsion device not driving the lens assembly, the lens assembly does not displace along the axial direction with respect to the aperture piece.

In accordance with an embodiment of the present disclosure, the variable aperture module includes a plurality of aperture pieces, wherein an aperture is defined by each of the aperture pieces, and diameters of the apertures of the aperture pieces are different from each other.

In accordance with an embodiment of the present disclosure, the camera module further includes a plurality of variable aperture modules, wherein each of the variable aperture modules includes an aperture piece, an aperture is defined by the aperture piece, one or more openings are defined by the wall of the lens barrel at one or more positions corresponding to the aperture pieces of the plurality of variable aperture modules.

In accordance with an embodiment of the present disclosure, a height of the opening is greater than a maximum displacement distance by which the axial propulsion device propels the lens assembly.

In accordance with an embodiment of the present disclosure, a guiding structure is defined by a surface of the lens, and is configured to guide the aperture piece into the lens assembly.

In accordance with an embodiment of the present disclosure, the lens assembly includes a spacer, and a guiding structure is defined by a surface of the spacer, and is configured to guide the aperture piece into the lens assembly.

In accordance with an embodiment of the present disclosure, the lens assembly includes a plurality of lens, the opening is defined between a first lens and a second lens closest to the object end, or between the second lens and a third lens closest to the object end.

In accordance with an embodiment of the present disclosure, the lens assembly includes an aperture, wherein a diameter of the aperture of the lens assembly is greater than a diameter of the aperture of the variable aperture module.

A camera module is provided in the present disclosure, includes:
at least one variable aperture module including:
at least one aperture piece, wherein an aperture is defined by the aperture piece;
a radial propulsion device configured to drive the aperture piece in a radial direction;
a lens module including:
a lens assembly being adjacent to the variable aperture module and including at least one lens and a lens barrel, wherein the lens barrel includes a wall surrounding a central axis of the lens assembly to define a receiving chamber, the lens is disposed in the receiving chamber, and an opening is defined by the wall of the lens barrel at a position corresponding to the aperture piece;

an axial propulsion device configured to drive the lens assembly along an axial direction toward an object end or an image end of the camera module;

wherein the radial direction is perpendicular to the central axis of the lens assembly, and the axial direction is parallel to the central axis of the lens assembly;

wherein the radial propulsion device is configured to propel the aperture piece in the radial direction approaching the central axis of the lens assembly, such that the aperture fully enters the receiving chamber through the opening defined by the wall of the lens barrel, and is coaxial with the lens assembly, and the radial propulsion device is configured to retract the aperture piece in the radial direction away from the central axis of the lens assembly, such that the aperture fully leaves the receiving chamber through the opening defined by the wall of the lens barrel.

In accordance with an embodiment of the present disclosure, the variable aperture module is not fixed onto the lens assembly.

In accordance with an embodiment of the present disclosure, in response to the axial propulsion device driving the lens assembly, the lens assembly displaces along the axial direction with respect to the aperture piece; in response to the axial propulsion device not driving the lens assembly, the lens assembly does not displace along the axial direction with respect to the aperture piece.

In accordance with an embodiment of the present disclosure, the variable aperture module includes a plurality of aperture pieces, wherein an aperture is defined by each of the aperture pieces, and diameters of the apertures of the aperture pieces are different from each other.

In accordance with an embodiment of the present disclosure, the camera module further includes a plurality of variable aperture modules, wherein each of the variable aperture modules includes an aperture piece, an aperture is defined by the aperture piece, one or more openings are defined by the wall of the lens barrel at one or more positions corresponding to the aperture pieces of the plurality of variable aperture modules.

In accordance with an embodiment of the present disclosure, a height of the opening is greater than a maximum displacement distance by which the axial propulsion device propels the lens assembly.

In accordance with an embodiment of the present disclosure, a guiding structure is defined by a surface of the lens, and is configured to guide the aperture piece into the receiving chamber.

In accordance with an embodiment of the present disclosure, the lens assembly includes a spacer, and a guiding structure is defined by a surface of the spacer, and is configured to guide the aperture piece into the receiving chamber.

In accordance with an embodiment of the present disclosure, the lens assembly includes a plurality of lenses, the opening is defined between a first lens and a second lens closest to the object end, or between the second lens and a third lens closest to the object end.

In accordance with an embodiment of the present disclosure, the lens assembly includes an aperture, wherein a diameter of the aperture of the lens assembly is greater than a diameter of the aperture of the variable aperture module.

In the camera module with the variable apertures in accordance with the present disclosure, the variable aperture module includes an aperture piece defining the aperture, and the radial propulsion device configured to drive the aperture piece in the radial direction approaching the central axis of the lens assembly. The aperture defined by the aperture piece enters the corresponding lens assembly through the opening defined by the wall of the lens barrel, and replaces the aperture of the lens assembly. On the other hand, the radial propulsion device is also configured to retract the aperture piece in the radial direction away from the central axis of the lens assembly. The aperture defined by the aperture piece leaves the corresponding lens assembly through the opening defined by the wall of the lens barrel, and, thus, switches back to the aperture of the lens assembly. A user can adjust aperture sizes of the camera module by selecting the aperture pieces with different aperture sizes to enter the lens assembly. Therefore, the camera module of the present disclosure is designed based upon the innovative variable aperture module and the corresponding lens module to achieve the above-mentioned variable aperture function.

BRIEF DESCRIPTION OF DRAWINGS

The foregoing aspects and many of the attendant advantages of this disclosure will become more readily appreciated as the same becomes better understood by reference to the following detailed description, when taken in conjunction with the accompanying drawings, wherein.

DETAILED DESCRIPTION OF PREFERRED EMBODIMENTS

Figure 1:
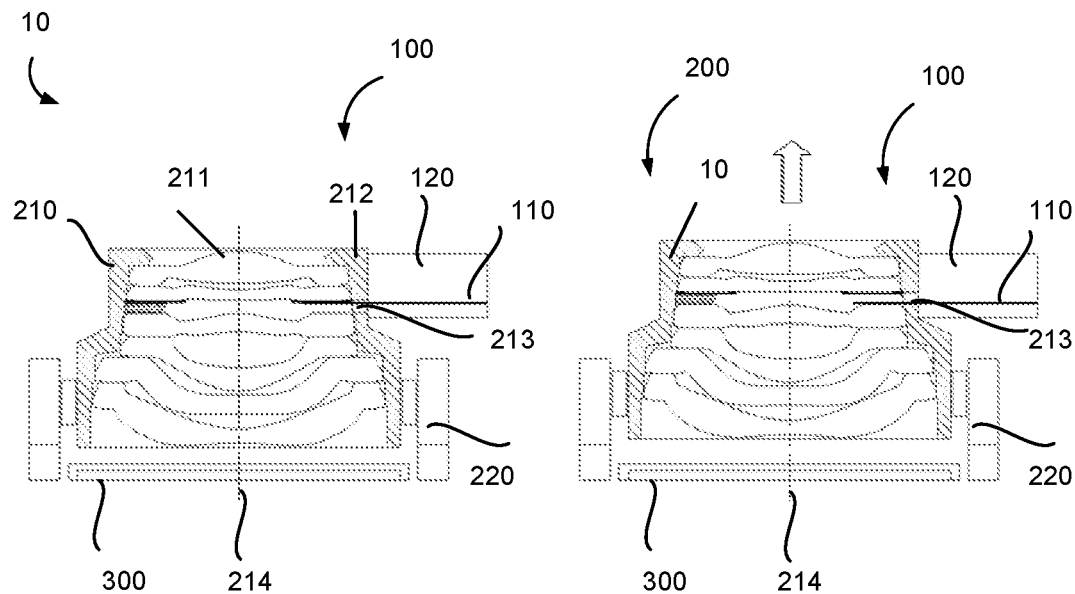
FIG. 1 is a side view illustrating a camera module with variable apertures in two different focusing configurations in accordance with an embodiment of the present disclosure.

The following description of the embodiments with reference to the accompanying drawings is used to illustrate particular embodiments of the present disclosure. The directional terms used in the present disclosure, such as "upper", "lower", "front", "back", "left", "right", "inner", "outer", "side surface", etc., are only directions with regard to the accompanying drawings. Therefore, the directional terms used for describing and illustrating the present disclosure are not intended to limit the present disclosure.

In the drawings, units with similar structures are indicated by the same reference number.

As to an "embodiment" mentioned herein, the particular features, structures, or characteristics described in this embodiment, which may be described in combination with the embodiment, may be included in at least one embodiment of the present disclosure. The phrases appearing at various locations in the specification do not necessarily refer to the same embodiments, nor to the embodiments being alternative to, mutually exclusive with, or independent from other embodiments. It is explicitly and implicitly understood by a person of ordinary skill in the art that the embodiments described herein may be combined with other embodiments.

The content of the present disclosure is described in detail by reference to embodiments below in conjunction with the accompanying drawings.

By reference to the accompanying drawings, the technological content and embodiments of the present disclosure are described in detail as follows:

Refer to FIG. 1, which is a side view illustrating a camera module 10 with variable apertures in two different focusing configurations in accordance with an embodiment of the present disclosure.

In an aspect of the present disclosure, a camera module 10 is provided and includes at least one variable aperture module 100 and a lens module 200. In an embodiment, the camera module 10 further includes an image sensor 300. The variable aperture module 100 includes at least one aperture piece 110 and a radial propulsion device 120. The lens module 200 includes a lens assembly 210 and an axial propulsion device 220.

Figure 2:
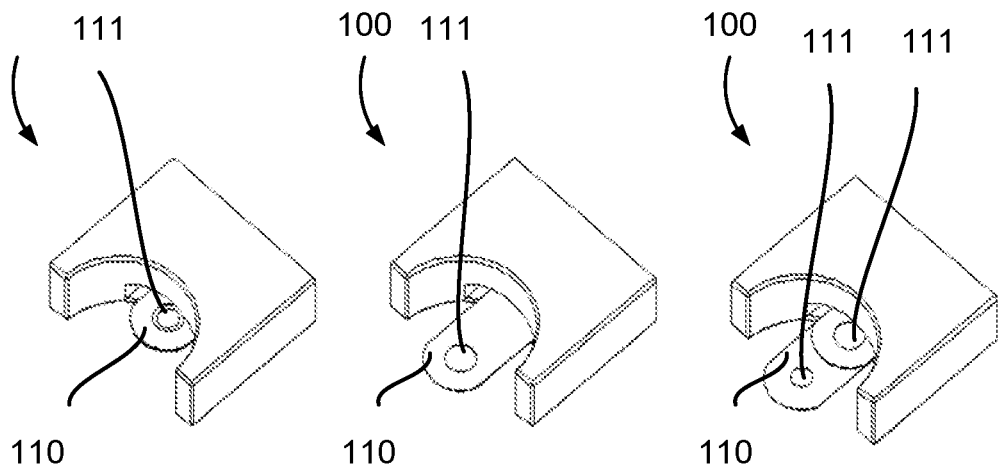
FIG. 2 is a perspective view illustrating a variable aperture module of the camera module in three different aperture configurations in accordance with an embodiment of the present disclosure.

Refer to FIG. 2, which is a perspective view illustrating the variable aperture module 100 of the camera module 10 in three different aperture configurations in accordance with an embodiment of the present disclosure.

In an embodiment, the variable aperture module 100 includes the plurality of aperture pieces 110, an aperture 111 is defined by each of the aperture piece 110 near an end of the aperture piece 110, and diameters of the apertures 111 of the aperture pieces 110 are different from each other, as shown in FIG. 2. In a preferred embodiment, material of the aperture piece includes flexible metal, and surfaces of the aperture piece 110 are blackened for reducing light reflectivity and stray light.

As shown in FIG. 2, the radial propulsion device 120 can moves the aperture pieces 110 in a reciprocating motion in radial directions of the lens assembly 210. The radial directions are perpendicular to an central axis 214 of the lens assembly 210. Specifically, the radial propulsion device 120 is configured to propel one of the aperture pieces 110 in the radial direction approaching the central axis 214 of the lens assembly 210 and is configured to retract the aperture pieces 110 in the radial direction away from the central axis 214 of the lens assembly 210. Preferably, the aperture pieces 110 held by the radial propulsion device 120 can be actuated separately and match the lens assembly 210 to achieve the function of the variable aperture module 100. Specifically, the radial propulsion device 120 propels one of the aperture pieces 110 in the radial direction approaching the central axis 214 of the lens assembly 210 for the use of the aperture 111 defined by the aperture piece 110, and retracts the aperture piece 110 in the radial direction away from the central axis 214 of the lens assembly 210 for the idleness of the aperture 111 defined by the aperture piece 110. A user can adjust aperture sizes of the camera module 10 by using the radial propulsion device 120 to propel the aperture pieces 110 with different aperture sizes into the lens assembly 210.

Refer to FIG. 2 for the three different aperture configurations of the variable aperture module 100. In each of the aperture configurations, one aperture is being used. The left part of FIG. 2 shows that no aperture 111 of the variable aperture module 100 is being used (however, an inherent aperture of the lens assembly 210 is being used, which is not shown in FIG. 2, but will be described hereafter). The middle part of FIG. 2 shows that the first aperture is being used. The right part of FIG. 2 shows that the second aperture is being used.

Refer back to FIG. 1. The lens assembly 210 is adjacent to the variable aperture module 100 (but is not fixed to the variable aperture module 100), and includes at least one lens 211 and a lens barrel 212 disposed around the lens 211. Preferably, the lens assembly 210 includes the plurality of lenses 211. Specifically, the lens barrel 212 includes a wall surrounding the central axis 214 of the lens assembly 210 to define a receiving chamber, and the lenses 211 are disposed along the central axis 214 in the receiving chamber.

At least one opening 213 is defined by the wall of the lens barrel 212 at a position corresponding to the aperture pieces 110. The radial propulsion device 120 propels one of the aperture pieces 110 in the radial direction approaching the central axis 214 of the lens assembly 210, such that a portion of the aperture piece 110 enters the lens assembly 210 through the opening 213 defined by the wall of the lens barrel 212. Specifically, the aperture 111 fully enters the receiving chamber through the opening 213 defined by the wall of the lens barrel 212, and is coaxial with the lens assembly 210 for the use of the aperture 111 defined by the aperture piece 110. In contrast, the radial propulsion device 120 retracts the aperture piece 110 in the radial direction away from the central axis 214 of the lens assembly 210, such that the portion of the aperture piece 110 leaving the lens assembly 210 through the opening 213 defined by the wall of the lens barrel 212. Specifically, the aperture 111 fully leaves the receiving chamber through the opening 213 defined by the wall of the lens barrel 212 for the idleness of the aperture 111 defined by the aperture piece 110. A user can adjust the aperture sizes of the camera module 10 by selecting the aperture pieces 110 with the different aperture sizes to enter the lens assembly 210.

Refer to FIG. 1 again. The axial propulsion device 220 is disposed around the lens assembly 210, and, in order to capture images of an object at different distances, the axial propulsion device 220 is configured to drive the lens assembly 210 along an axial direction toward an object end or an image end of the camera module for focusing on the object. The axial direction is parallel to the central axis 214 of the lens assembly 210. The left part of FIG. 1 shows focusing on an object an infinite away, and the right part of FIG. 1 shows focusing on an object at a distance of 10 cm.

One of the important features of the present disclosure is that the variable aperture module 100 is not fixed onto the lens assembly 210. Moreover, the variable aperture module 100 and the lens assembly 210 are separated, separately fixed or fixed onto different components. For example, the variable aperture module 100 is fixed onto a housing of the camera module 10, and the lens assembly 210 is slidably fixed onto the axial propulsion device 220. Therefore, in response to the axial propulsion device 220 driving the lens assembly 210, the lens assembly 210 displaces along the axial direction with respect to the aperture piece 110. In response to the axial propulsion device 220 not driving the lens assembly 210, the lens assembly 210 does not displace along the axial direction with respect to the aperture piece 110. Otherwise, if the variable aperture module 100 were driven together with the lens assembly 210 by the axial propulsion device 220 at the same time, total weight of the lens assembly 210 and the variable aperture module 100 would be too heavy, resulting in insufficient thrust from the axial propulsion device 220.

In some embodiments of the present disclosure, the axial propulsion device 220 may be a voice coil motor (VCM), an ultrasonic motor, a stepper motor, a memory alloy motor. Preferably, the axial propulsion devise 220 is a voice coil motor 220. A voice coil motor is a linear motor, and includes a voice coil providing the motive force to a cone by the reaction of a magnetic field to the current passing through the voice coil. In terms of the structure, the voice coil motor may be a shrapnel voice coil motor, a ball voice coil motor, and a friction voice coil motor. In terms of the function, the voice coil motor may be an open loop open motor, a close loop closed loop motor, an alternate mid-mounted motor, and an OIS optical image stabilization motor. However, various types of motors are only examples of the axial propulsion device 220, and should not be regarded as limiting.

In order to prevent interference of the aperture piece 110 with the lens assembly 210 when the lens assembly 210 is moving for focusing on the object, which causes the aperture pieces 110 not be able to smoothly switched or to be scratched during switching, there are some restrictions on the design of the camera module 10 under the limitation that the variable aperture module 100 and the lens assembly 210 are separately fixed.

Figure 3:
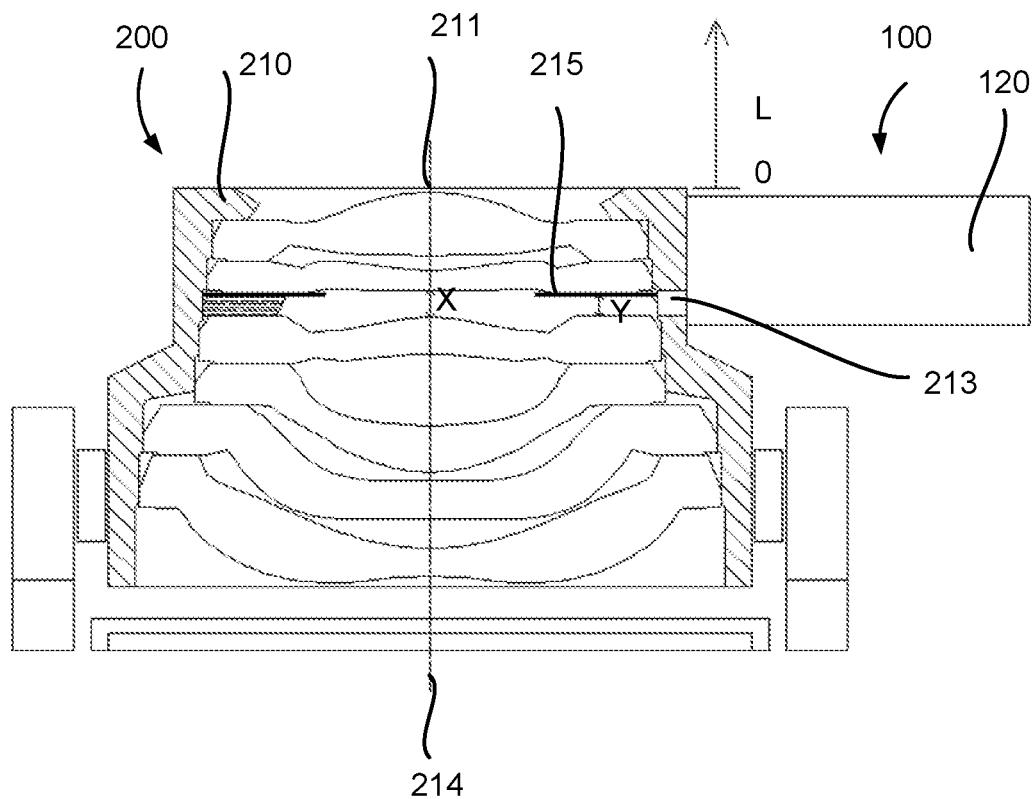
FIG. 3 is a side view illustrating a physical structure and a spatial relationship of the camera module in accordance with an embodiment of the present disclosure.

Refer to FIG. 3, which is a side view illustrating a physical structure and a spatial relationship of the camera module 10 in accordance with an embodiment of the present disclosure.

As shown in FIG. 3, the physical structure and spatial relationship in the camera module 10 are further defined. Firstly, when the object is at an infinite distance, the position of the lens assembly 210 is on a reference surface and is set to be 0. When an object is at a distance of 10 cm, an entire moving distance of the lens assembly 210 is L for focusing on the object. Secondly, a distance from a central apex of the lens near the position of the aperture piece 111 to a central apex of the adjacent lens is X. Thirdly, a distance from the inherent light shielding film 215 of the lens assembly 210 to a bearing surface of the lens 211 is Y. The relationship between Y and L is L Y, and a relationship between X and L is L≤X−0.05 mm (0.03 mm is a thickness of the inherent light shielding film 215 of the lens assembly 210, and 0.02 mm is a distance from the apex of the lens 211 to the aperture 111 of the aperture piece 110), thus forming a compact camera module 10.

Figure 4:
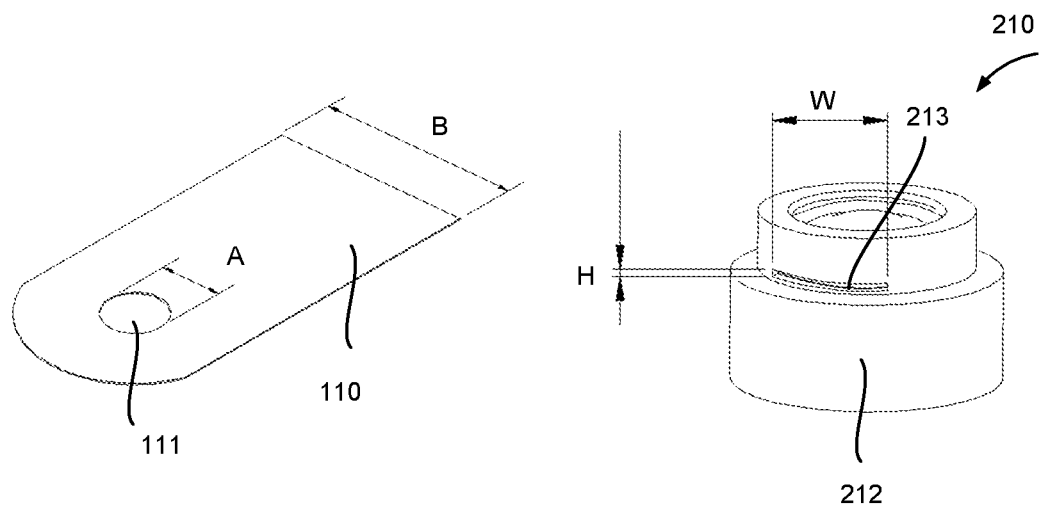
FIG. 4 is a perspective view illustrating a physical structure and a spatial relationship of the variable aperture module in accordance with an embodiment of the present disclosure.

Refer to FIG. 4, which is a perspective view illustrating a physical structure and a spatial relationship of the variable aperture module 100 in accordance with an embodiment of the present disclosure.

As shown in FIG. 4, in order to match the lens assembly 210 with the variable aperture module 100, it is required to open the opening 213 in the lateral wall of the lens barrel 212 for inserting the metal aperture piece 110 into the lens assembly 210. The limitations to the opening 213 are that a width of the opening (W) is greater than a width of the aperture pieces (B): W>B, the width of the aperture pieces (B) is the diameter of the aperture 111 plus 0.5 mm B=A+0.5 mm, and a height of the opening (H) is greater than the axial displacement of the lens assembly 210 for focusing (L): H>L.

Therefore, in order to prevent the interference of the aperture piece 110 with the lens assembly 210 when the lens assembly 210 is moving for focusing on the object, the height of the opening 213 is greater than the maximum displacement distance (L) by which the axial propulsion device 220 propels the lens assembly 210.

In addition, in a typical embodiment of the present disclosure, the lens assembly includes the plurality of lenses 211. The variable aperture module 100 of the present disclosure can be applied to a lens module 200 including 4 lenses, 5 lenses or more. The opening 213 (or an aperture switching position) is not limited to a position between specific lenses 211 in the lens assembly 210. However, the opening 213 (or an aperture switching position) is preferably defined between a first lens 211 and a second lens 211 closest to the object end (not shown in FIGS.), or between the second lens 211 and a third lens 211 closest to the object end (shown in FIGS. 1, 3, 5, 6, 8), because a part of the lens barrel 212 close to the image end is configured to be fixed into the axial propulsion device 220, and the part of the lens barrel 212 close to the image end has no space for the interaction with the variable aperture module 100.

Figure 5:
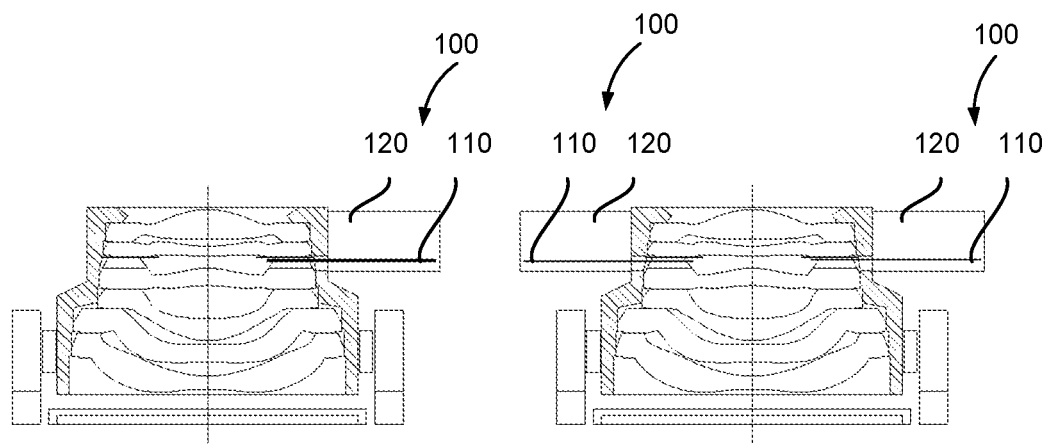
FIG. 5 is a side view illustrating the camera module with a single variable aperture module and the camera module with two variable aperture modules in accordance with an embodiment of the present disclosure.

Refer to FIG. 5, which is a side view illustrating the camera module 10 with a single variable aperture module 100 and the camera module 10 with two variable aperture modules 100 in accordance with an embodiment of the present disclosure.

In an embodiment of the present disclosure, the camera module 10 may include the plurality of variable aperture modules 100. The camera module 10 including two variable aperture modules 100 is shown in the right part of FIG. 5. Each of the variable aperture modules 100 includes an aperture piece 110, an aperture 111 is defined by the aperture piece 110, one or more openings 213 are defined by the wall of the lens barrel 212 at one or more positions corresponding to the aperture pieces 110 of the plurality of variable aperture modules 100.

As shown in FIG. 5, a first aperture piece 110 and a second aperture piece 110 are inserted into the lens assembly 210 respectively through two different openings 213, which reduces the height of the openings 213, and further reduces a thickness of the lens assembly 210.

In order to ensure that the aperture pieces 110 move in the reciprocating motion to switch the apertures 111, two design embodiments are provided below.

First Design Embodiment

Figure 6:
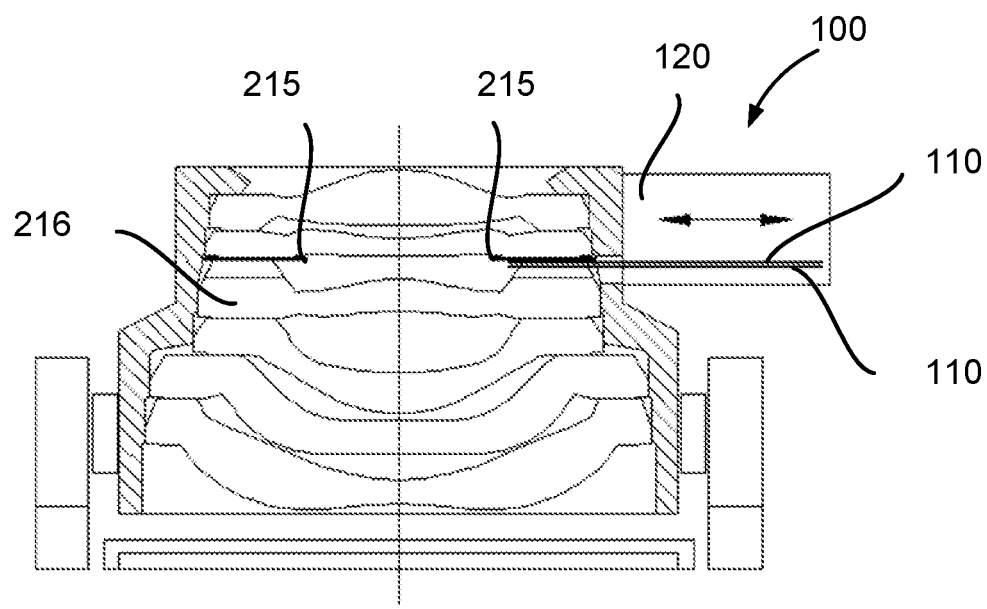
FIG. 6 is a side view illustrating a guiding structure defined by a surface of a lens in the camera module in accordance with an embodiment of the present disclosure.

Refer to FIG. 6, which is a side view illustrating a guiding structure 216 defined by a surface of the lens 211 in the camera module 10 in accordance with an embodiment of the present disclosure.

As shown in FIG. 6, the guiding structure 216 is defined by the surface of the lens 211, and is configured to guide the aperture piece 110 into the lens assembly 210, or the receiving chamber. Specifically, the aperture piece 110 of the variable aperture module 100 passes through the opening 213 defined by the wall of the lens barrel 212, is guided by the guiding structure 216 defined by the lens 211 in the lens assembly 210, and is driven by the radial propulsion device 120 for switching the apertures 111.

Figure 7:
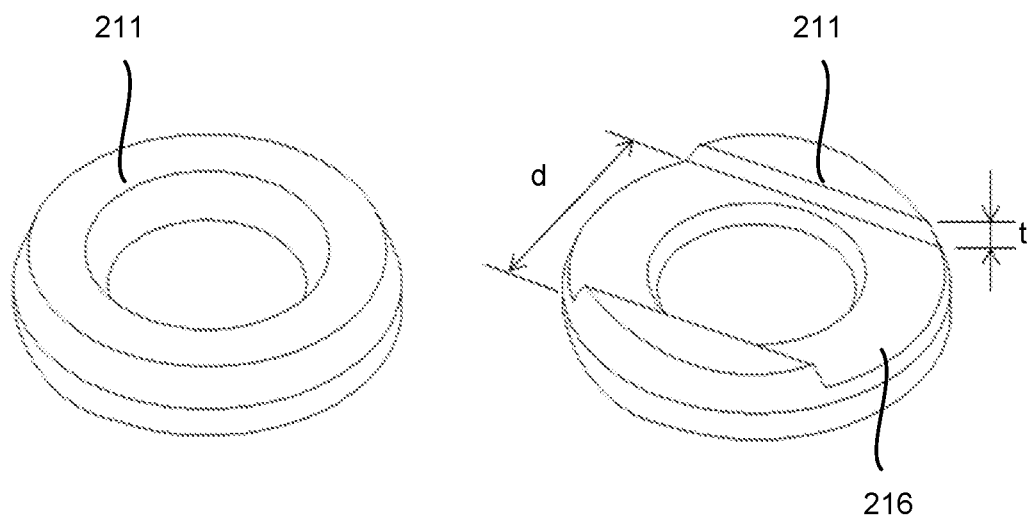
FIG. 7 is a perspective view illustrating the guiding structure defined by the surface of the lens in accordance with an embodiment of the present disclosure.

Refer to FIG. 7, which is a perspective view illustrating the guiding structure 216 defined by the surface of the lens 211 in accordance with an embodiment of the present disclosure. The left part of FIG. 7 shows the lens 211 without the guiding structure, and the right part of FIG. 7 shows the lens 211 with the guiding structure 216. In an embodiment, the guiding structure 216 is designed as a groove, as shown in FIG. 7. Specifically, in response to the radial propulsion device 120 propelling the aperture piece 110, the aperture piece 110 slides along the groove 216 into the lens assembly 210 or the receiving chamber. In response to the radial propulsion device 120 retracting the aperture piece 110, the aperture piece 110 slides along the groove 216 out of the lens assembly 210 or the receiving chamber.

A width of the guiding structure 216 is d, and a relationship between the guiding structure 216 and the aperture piece 110 is that the width of the guiding structure 216 (d) is greater than the width of the aperture piece 110 (B): d>B, and a depth of the guiding structure 216 (t) is greater than or equals to the axial displacement of the lens assembly (L): t≥L.

In other embodiments, the guiding structure 216 may also be designed as a track, a rail, etc. for facilitating sliding motions of the aperture pieces 110. Various types of the guiding structures 216 are only examples, and should not be regarded as limiting.

Second Design Embodiment

Figure 8:
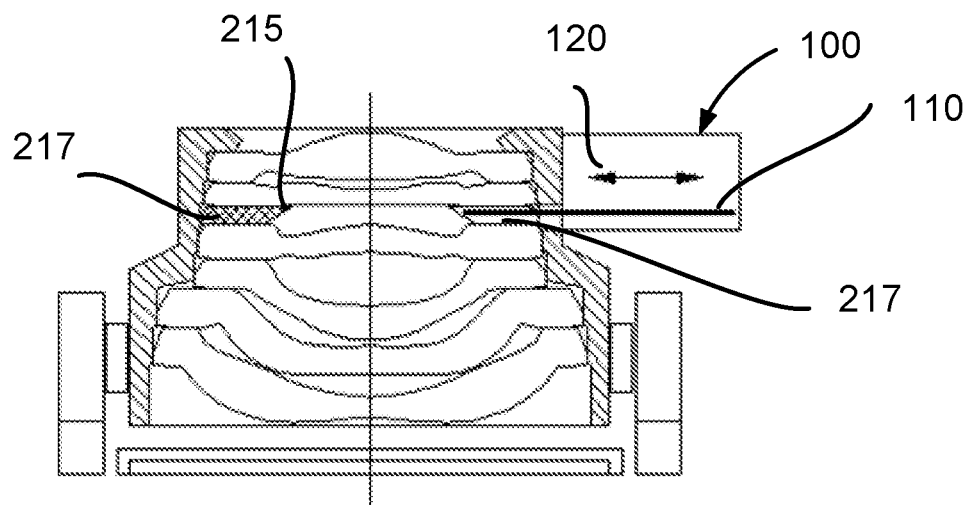
FIG. 8 is a side view illustrating the guiding structure defined by a surface of a spacer in the camera module in accordance with an embodiment of the present disclosure.

Refer to FIG. 8, which is a side view illustrating the guiding structure defined by a surface of a spacer 217 in the camera module 10 in accordance with an embodiment of the present disclosure.

In order to avoid flawed lens formation, the lens assembly 210 includes the spacer 217, which is disposed between two of the lenses 211 to reduce a thickness unevenness of the lenses 211, and material of the spacer 217 may be plastic or metal. As shown in FIG. 8, the guiding structure is defined by the surface of the spacer 217, and is configured to guide the aperture piece 110 into the lens assembly or the receiving chamber. Specifically, the aperture piece 110 of the variable aperture module 100 passes through the opening 213 defined by the wall of the lens barrel 212, is guided by the guiding structure defined by the spacer 217 in the lens assembly 210, and is driven by the radial propulsion device 120 for switching the apertures 111.

Similarly, the guiding structure defined by the surface of the spacer 217 is also designed as a groove. Specifically, in response to the radial propulsion device 120 propelling the aperture piece 110, the aperture piece 110 slides along the groove into the lens assembly 210 or the receiving chamber. In response to the radial propulsion device 120 retracting the aperture piece 110, the aperture piece 110 slides along the groove out of the lens assembly 210 or the receiving chamber.

The width of the guiding structure defined by the spacer 217 is d, and the relationship between the guiding structure and the aperture piece is that the width of the guiding structure (d) is greater than the width of the aperture piece 110 (B): d>B, and the depth of the guiding structure (t) is greater than or equals to the displacement of the lens assembly (L): t≥L.

In other embodiments, the guiding structure may also be designed as a track, a rail, etc. for facilitating sliding motions of the aperture pieces 110. Various types of the guiding structures 216 are only examples, and should not be regarded as limiting.

Moreover, in a typical embodiment of the present disclosure, the lens assembly 210 includes its own inherent aperture, for instance, the aperture of the lens assembly 210 is defined by the light shielding film 215 or the spacer 217, and a diameter of the aperture of the lens assembly 210 is greater than the diameters of the apertures of the variable aperture module 100, and is the greatest among all of the apertures in the entire camera module 10, such that one of the apertures 111 of the variable aperture module 100 enters the corresponding lens assembly 210 through the opening 213 defined by the wall of the lens barrel, to replace the aperture of the lens assembly 210. If no aperture of the variable aperture module 100 enters the corresponding lens assembly 210, the aperture of the lens assembly 210 is in operation.

In an embodiment of the present disclosure, the camera module 10 further includes an image sensor 300. The image sensor 300 is positioned near the image end of the camera module 10 and configured for receiving the optical image of the object formed by the lenses 211. In some embodiments, the image sensor 300 may be a charged-coupled device (CCD), or a complementary metal-oxide-semiconductor transistor (CMOS). The image sensor 300 is configured to convert light signals into electrical signals. The image sensor 300 is one selected from the group consisting of a ceramic leaded chip carrier package type image sensor, a plastic leaded chip carrier package type image sensor and a chip scale package type image sensor. However, various types of the image sensor 300 are only examples, and should not be regarded as limiting.

In the camera module with the variable apertures in accordance with the present disclosure, the variable aperture module includes an aperture piece defining the aperture, and the radial propulsion device configured to drive the aperture piece in the radial direction approaching the central axis of the lens assembly. The aperture defined by the aperture piece enters the corresponding lens assembly through the opening defined by the wall of the lens barrel, and replaces the aperture of the lens assembly. On the other hand, the radial propulsion device is also configured to retract the aperture piece in the radial direction away from the central axis of the lens assembly. The aperture defined by the aperture piece leaves the corresponding lens assembly through the opening defined by the wall of the lens barrel, and, thus, switches back to the aperture of the lens assembly. A user can adjust aperture sizes of the camera module by selecting the aperture pieces with different aperture sizes to enter the lens assembly. Therefore, the camera module of the present disclosure is designed based upon the innovative variable aperture module and the corresponding lens module to achieve the above-mentioned variable aperture function.

The present disclosure has been described with a preferred embodiment thereof and it is understood that various modifications, without departing from the spirit of the present disclosure, are in accordance with the embodiments of the present disclosure. Hence, the embodiments described are intended to cover the modifications within the scope and the spirit of the present disclosure, rather than to limit the present disclosure.

In summary, although the preferable embodiments of the present disclosure have been disclosed above, the embodiments are not intended to limit the present disclosure. A person of ordinary skill in the art, without departing from the spirit and scope of the present disclosure, can make various modifications and variations. Therefore, the scope of the disclosure is defined in the claims.

What is claimed is:

1. A camera module comprising:
   at least one variable aperture module including:
   at least one aperture piece, wherein an aperture is defined by the aperture piece;
   a radial propulsion device configured to drive the aperture piece in a radial direction;
   a lens module including:
   a lens assembly being adjacent to the variable aperture module and including at least one lens and a lens barrel disposed around the lens, wherein an opening is defined by a wall of the lens barrel at a position corresponding to the aperture piece;

an axial propulsion device configured to drive the lens assembly along an axial direction toward an object end or an image end of the camera module;

wherein the radial direction is perpendicular to a central axis of the lens assembly, and the axial direction is parallel to the central axis of the lens assembly;

wherein the radial propulsion device is configured to propel the aperture piece in the radial direction approaching the central axis of the lens assembly, such that a portion of the aperture piece enters the lens assembly through the opening defined by the wall of the lens barrel, and the radial propulsion device is configured to retract the aperture piece in the radial direction away from the central axis of the lens assembly, such that the portion of the aperture piece leaving the lens assembly through the opening defined by the wall of the lens barrel;

wherein in response to the axial propulsion device driving the lens assembly, the lens assembly displaces along the axial direction with respect to the aperture piece; in response to the axial propulsion device not driving the lens assembly, the lens assembly does not displace along the axial direction with respect to the aperture piece.

2. The camera module as claimed in claim 1, wherein the variable aperture module is not fixed onto the lens assembly.

3. The camera module as claimed in claim 1, wherein the variable aperture module includes a plurality of aperture pieces, wherein an aperture is defined by each of the aperture pieces, and diameters of the apertures of the aperture pieces are different from each other.

4. The camera module as claimed in claim 1, further comprising a plurality of variable aperture modules, wherein each of the variable aperture modules includes an aperture piece, an aperture is defined by the aperture piece, one or more openings are defined by the wall of the lens barrel at one or more positions corresponding to the aperture pieces of the plurality of variable aperture modules.

5. The camera module as claimed claim 1, wherein a height of the opening is greater than a maximum displacement distance by which the axial propulsion device propels the lens assembly.

6. The camera module as claimed claim 1, wherein a guiding structure is defined by a surface of the lens, and is configured to guide the aperture piece into the lens assembly.

7. The camera module as claimed in claim 1, wherein the lens assembly includes a spacer, and a guiding structure is defined by a surface of the spacer, and is configured to guide the aperture piece into the lens assembly.

8. The camera module as claimed in claim 1, wherein the lens assembly includes a plurality of lens, the opening is defined between a first lens and a second lens closest to the object end, or between the second lens and a third lens closest to the object end.

9. The camera module as claimed in claim 1, wherein the lens assembly includes an aperture, wherein a diameter of the aperture of the lens assembly is greater than a diameter of the aperture of the variable aperture module.

10. A camera module comprising:
at least one variable aperture module including:
at least one aperture piece, wherein an aperture is defined by the aperture piece;
a radial propulsion device configured to drive the aperture piece in a radial direction;

a lens module including:
a lens assembly being adjacent to the variable aperture module and including at least one lens and a lens barrel, wherein the lens barrel includes a wall surrounding a central axis of the lens assembly to define a receiving chamber, the lens is disposed in the receiving chamber, and an opening is defined by the wall of the lens barrel at a position corresponding to the aperture piece;

an axial propulsion device configured to drive the lens assembly along an axial direction toward an object end or an image end of the camera module;

wherein the radial direction is perpendicular to the central axis of the lens assembly, and the axial direction is parallel to the central axis of the lens assembly;

wherein the radial propulsion device is configured to propel the aperture piece in the radial direction approaching the central axis of the lens assembly, such that the aperture fully enters the receiving chamber through the opening defined by the wall of the lens barrel, and is coaxial with the lens assembly, and the radial propulsion device is configured to retract the aperture piece in the radial direction away from the central axis of the lens assembly, such that the aperture fully leaves the receiving chamber through the opening defined by the wall of the lens barrel;

wherein in response to the axial propulsion device driving the lens assembly, the lens assembly displaces along the axial direction with respect to the aperture piece; in response to the axial propulsion device not driving the lens assembly, the lens assembly does not displace along the axial direction with respect to the aperture piece.

11. The camera module as claimed in claim 10, wherein the variable aperture module is not fixed onto the lens assembly.

12. The camera module as claimed in claim 10, wherein the variable aperture module includes a plurality of aperture pieces, wherein an aperture is defined by each of the aperture pieces, and diameters of the apertures of the aperture pieces are different from each other.

13. The camera module as claimed in claim 10, further comprising a plurality of variable aperture modules, wherein each of the variable aperture modules includes an aperture piece, an aperture is defined by the aperture piece, one or more openings are defined by the wall of the lens barrel at one or more positions corresponding to the aperture pieces of the plurality of variable aperture modules.

14. The camera module as claimed claim 10, wherein a height of the opening is greater than a maximum displacement distance by which the axial propulsion device propels the lens assembly.

15. The camera module as claimed claim 10, wherein a guiding structure is defined by a surface of the lens, and is configured to guide the aperture piece into the receiving chamber.

16. The camera module as claimed in claim 10, wherein the lens assembly includes a spacer, and a guiding structure is defined by a surface of the spacer, and is configured to guide the aperture piece into the receiving chamber.

17. The camera module as claimed in claim 10, wherein the lens assembly includes a plurality of lenses, the opening is defined between a first lens and a second lens closest to the object end, or between the second lens and a third lens closest to the object end.

18. The camera module as claimed in claim 10, wherein the lens assembly includes an aperture, wherein a diameter of the aperture of the lens assembly is greater than a diameter of the aperture of the variable aperture module.

\* \* \* \* \*